UNITED STATES PATENT OFFICE.

GUSTAV ADOLF BOSSHARD, OF ARBON, SWITZERLAND, ASSIGNOR TO THE FIRM A.-G. SEERIET, BLEICHEREI, FILIALE ARBON, OF ARBON, SWITZERLAND.

PROCESS FOR PRODUCING WOOL-LIKE EFFECTS ON COTTON FABRICS.

1,400,016.    Specification of Letters Patent.    Patented Dec. 13, 1921.

No Drawing.    Application filed July 9, 1920. Serial No. 394,979.

*To all whom it may concern:*

Be it known that I, GUSTAV ADOLF BOSSHARD, a citizen of the Republic of Switzerland, residing at Rebenstrasse 44, Arbon, Switzerland, have invented certain new and useful Improvements in a Process for Producing Wool-Like Effects on Cotton Fabrics; and I do hereby declare the following to be a clear, full, and exact description of the invention, such as will enable others skilled in the art to which it appertains to make and use the same.

It is known to impart to cotton a transparent appearance by subjecting it to the action of concentrated mineral acids.

Mercer already in 1844 observed that a parchment-like appearance could be produced on cotton by the action of concentrated sulfuric acid of from 49.5 to 55.5° Bé. It has also been ascertained that wool-like effects may be produced on cotton fabrics by alternate or consecutive treatment of the cotton fabric with sulfuric acid of from 49 to 51° Bé. and with concentrated alkaline lyes. By causing nitric acid in concentrations of from 42.3° Bé. upward (1.415 spec. gravity) or sulfuric acid of 49° Bé. and upward (1.515 spec. gravity) to act on cotton a process analogous to mercerization with concentrated alkaline lyes takes place with a swelling of the fiber, shrinking and increase in length.

This invention is based on the fact that the gelatinous parchment-like effects due to the action of strong nitric or sulfuric acid on bleached or mercerized fabrics are considerably intensified if use is made in the place of this acid alone of a nitrifying or nitro-sulfuric acid of about 48° Bé. to 50.5° Bé. cooled to 0° C. or below 0° C., that is to say a liquid obtained by the bringing together of nitric acid of from 40-41° Bé. (at 15° C.) and of sulfuric acid of from 55-58° Bé. (at 15° C.).

By using, for example, a nitro-sulfuric acid consisting of one part by volume of sulfuric acid of 56.5° Bé. and one part by volume of nitric acid of 40° Bé. the cotton fabric assumes slightly parchment-like, gelatinous, supple, dense, and wool-like effects.

By printing upon bleached or mercerized cotton fabrics with reserves, such fabrics when treated with a nitro-sulfuric acid of the above mentioned concentration enable in parts only wool-like effects to be obtained.

The fact that the process may be carried out with a concentration of 48.3° Bé. is the reason why softer effects are obtainable than those attained by the processes hitherto known.

It will be noted that the treatment of the fabric takes place at low temperatures, as low as twenty degrees below zero centigrade. Also, if the concentration of the nitro-sulfuric acid be but slightly greater than 48.3° Bé. the wool-like appearance is not so prone to be formed.

I claim:

1. In a process for producing wool-like effects on cotton fabrics, the step of treating the fabrics with nitro-sulfuric acid of 48.3° Bé. cooled down to at least 0° C.

2. In a process for producing wool-like effects on cotton fabrics, the step of treating the fabric with nitro-sulfuric acid cooled down to a temperature of from 0° C. to −20° C. and obtained by mixing one part by volume of sulfuric acid of 56.5° Bé. and one part by volume of nitric acid of 40° Bé.

3. The step in the manufacture of wool-like cotton fabrics which comprises treating a woven cotton fabric with nitro-sulfuric acid of a concentration not greater than 48.3° Bé. at temperatures below atmospheric temperatures.

In testimony that I claim the foregoing as my invention, I have signed my name.

GUSTAV ADOLF BOSSHARD.